United States Patent
Petit et al.

(10) Patent No.: US 8,271,760 B2
(45) Date of Patent: Sep. 18, 2012

(54) SPATIAL LOCALITY OF FILE SYSTEM BLOCK ALLOCATIONS FOR RELATED ITEMS

(76) Inventors: Brent J. Petit, Minneapolis, MN (US); Laurie Costello, Painted Post, NY (US); Joe Habermann, Minneapolis, MN (US); Stephen P. Lord, Prior Lake, MN (US); James Mostek, Lilydale, MN (US); John Reinart, Roseville, MN (US)

( * ) Notice: Subject to any disclaimer, the term of this patent is extended or adjusted under 35 U.S.C. 154(b) by 300 days.

(21) Appl. No.: 12/793,056

(22) Filed: Jun. 3, 2010

(65) Prior Publication Data

US 2010/0312959 A1    Dec. 9, 2010

Related U.S. Application Data

(60) Provisional application No. 61/184,284, filed on Jun. 4, 2009.

(51) Int. Cl.
*G06F 12/00* (2006.01)

(52) U.S. Cl. ....................................................... 711/170

(58) Field of Classification Search .................. None
See application file for complete search history.

(56) References Cited

U.S. PATENT DOCUMENTS

| 5,392,426 A | * | 2/1995 | Urbanski et al. ............... 709/227 |
| 5,758,333 A | * | 5/1998 | Bauer et al. .................... 707/802 |

* cited by examiner

*Primary Examiner* — Hiep Nguyen

(57) ABSTRACT

Example apparatus, methods, and computers facilitate improving spatial locality of file system block allocations for related items. One example method includes accessing a block allocation request that is configured to control a computer to allocate a block of storage available on a storage device and, upon determining that the block allocation request includes a session key that identifies a session associated with a block reservation pool, controlling the computer to allocate a block of storage from the block reservation pool to satisfy the block allocation request rather than allocating a block of storage from generally available blocks of storage. The block reservation pool includes blocks of storage on the storage device that satisfy a spatial locality relationship determined by a pre-read technique associated with the storage device.

20 Claims, 6 Drawing Sheets

SPATIAL LOCALITY OF FILE SYSTEM BLOCK ALLOCATIONS FOR RELATED ITEMS

CROSS-REFERENCE TO RELATED APPLICATIONS

This application claims the benefit of U.S. Provisional Application No. 61/184,284 filed Jun. 4, 2009.

BACKGROUND

Many computerized workflows access data files in a known, repeated, well-ordered manner. Therefore, disk blocks that are likely to be read can be predicted with some accuracy for these workflows. Storage devices (e.g., disks, tapes, redundant arrays of independent disks (RAID)) may have the ability to pre-read data blocks. Having the ability to predictive data caching using pre-read behavior may also be described as having the ability to do read-ahead. Therefore, pre-read and read-ahead are used interchangeably herein. When pre-read data blocks are blocks that are actually needed (e.g., the object of a subsequent actual read request), dramatic performance increases are achieved. For example, pre-reading a block that is then the object of an actual read can reduce the latency for that actual read from the longer latency associated with accessing a storage device (e.g., disk, tape) to the shorter latency associated with accessing memory. Conventionally, successful pre-reads may have depended on factors including luck, coincidental spatial locality of data blocks, and predictions based on observed behavior.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
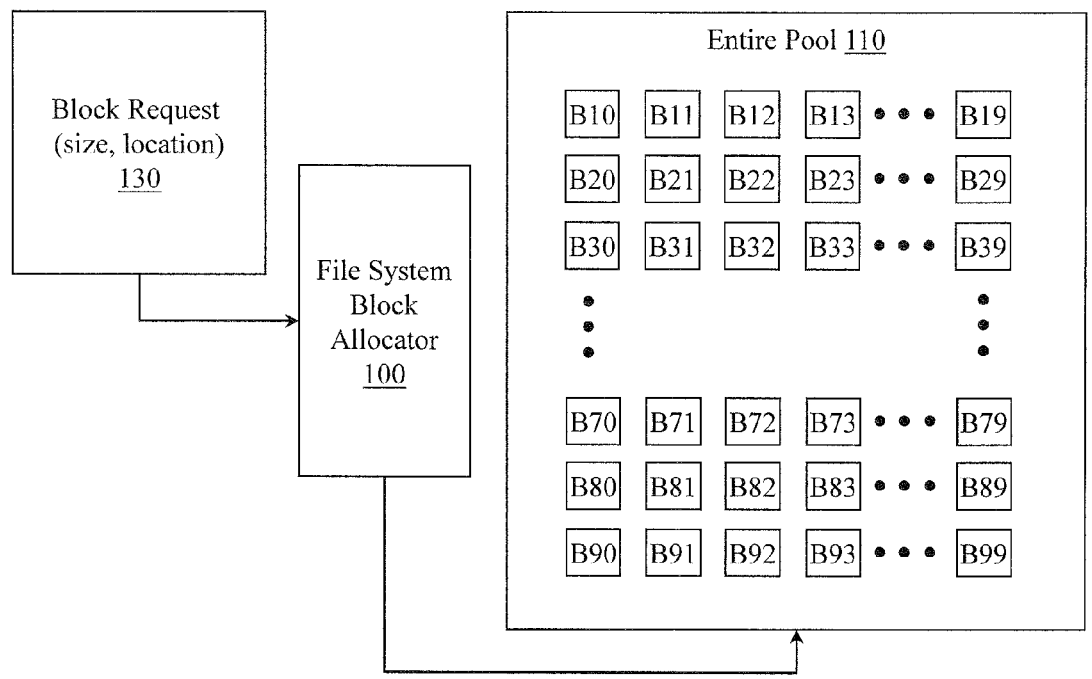
FIG. 1 illustrates a conventional file system block allocator.

Since some workflows are known and/or knowable, example apparatus and methods attempt to layout data on storage devices (e.g., disk) to increase the likelihood that pre-read blocks will be used to satisfy actual reads. The layout can be guided by deliberately and intelligently placing related blocks close together under user control rather than allowing the default block allocation intelligence to place blocks without consideration of spatial relationships. Therefore, example apparatus and methods control block allocation to produce spatial locality relationships between related blocks. The spatial locality relationships are designed to take advantage of the read-ahead behavior of the underlying storage device (e.g., disk).

Example apparatus and methods control how a file system block allocator will respond to block allocation requests. Conventionally, a block allocation request includes a size and a location. The size identifies how much space is required. The location identifies a position to be filled in a file by the block allocation. Example apparatus and methods include an additional parameter configured to facilitate improving spatial locality between related items (e.g., files) in light of pre-read behavior. The additional parameter facilitates identifying blocks for which a desired spatial locality is desired. In one example, the additional parameter may be a session key that identifies a session with which block allocation requests are to be associated. Thus, rather than treating each block allocation separately and individually, without regard to pre-read behavior, example apparatus and methods view block allocations in the context of other related block allocations and in the context of pre-read behavior.

To facilitate achieving spatial locality relationships, an initial block allocation request for a session may lead to a group of blocks being reserved for the session rather than just a single block being allocated to satisfy the request. The group may be arranged, for example, as a contiguous span of blocks, or as a collection designed in light of pre-read behavior associated with a specific device (e.g., disk). Subsequent block allocation requests associated with the session, as identified by the session key, may be satisfied from the reserved span rather than from generally available or random locations. Reserving extra blocks may increase the physical storage associated with a file or a session, which in turn may lead to some storage not being used. However, the payoff for having some blocks in the reserved span go unused is the increasing likelihood that pre-reads will later satisfy actual reads. Periodic defragmentation, either global or within session reservations, can mitigate issues associated with unused blocks in reserved spans. While different defragmentation approaches are possible, in general, if a set of files was created within a session, then that set of files should also only be defragmented inside a session.

A session key, or other spatial relationship identifier, can originate from different places. In one embodiment, a user may produce the key and associate it with a set of files. In another embodiment, an application or application suite can establish the session key for a set of files associated with the application or suite. In another embodiment, a file system may establish a session key based, at least in part, on information gathered from the environment in which the data to be stored originated. For example, a session key could be established for files located in the same directory. In another example, a session key could be established for files manipulated (e.g., created, edited) by a process (e.g., video editor).

Example apparatus and methods may behave differently for a first allocation request associated with a session key and for subsequent allocation requests associated with a session key. Example apparatus and methods also handle block allocation requests differently based on whether a request includes a session identifier. When a block allocation request is received, example apparatus and methods check to see whether there is a session identifier. If there is no session identifier, then the request is handled in a conventional way by the file system allocator. The allocation request will not be satisfied from a span that has been reserved for a session.

If there is a session identifier, then the request is handled in light of locality and span reservations. In one embodiment, the session key is provided to the file system block allocator. The file system block allocator checks for an existing block reservation. If a block reservation exists and if adequate space remains in the reservation, then the allocation is satisfied from the reservation. If no block reservation exists, then a new reservation may be created and the allocation is satisfied from the new reservation.

Blocks can be allocated from a reservation in an order that facilitates improving the likelihood that a pre-read block will be used. In one example, blocks may be collected from the reservation in contiguous order. In another example, blocks may be allocated according to a pre-determined pattern associated with the pre-read technique. In yet another example, the file system block allocator will allocate blocks using its default technique but with the source range being defined by the reservation.

Consider a set of files all located in a single directory. Example systems and methods may be configured to arrange files from a single directory next to each other on disk. Arranging files together on disk is facilitated by identifying that an allocation request is associated with a file in an identified directory. If the request is the first allocation request for the directory, more space than is needed for just the file associated with the allocation request is allocated. How much extra space is allocated can be a configurable option. Subsequent allocation requests for files in the directory will be satisfied from the extra space, rather than from random, unrelated locations.

In one embodiment, multiple streams associated with multiple processes and multiple directories may be handled concurrently. Unique session keys associated with the streams, processes, and/or directories facilitate keeping the reservations and extra spaces separate.

Rich media streaming applications illustrate one example of how improving spatial locality of file system block allocations for related items can yield improvements over conventional systems. Rich media can include, for example, video combined with text and graphics to make a movie-like presentation. In one example, a rich media editor may separate each frame of a video stream into a separate file. Having each frame in a separate file may make it difficult, if even possible at all, for conventional systems to produce smooth ingest and smooth playback performance due to file system overhead and disk latency. One way to improve playback performance is to improve the number of pre-reads that satisfy actual reads and to limit the number of actual reads that are not satisfied from pre-reads. Example apparatus and methods can produce reservation pools that can be used to improve spatial locality between files, which in this example are individual frames. Related frames, for which smooth playback is desired, even in an editor, can be grouped into a single directory, or otherwise related based on a session key. The related frames will then be stored together on disk in an arrangement tailored to a pre-read technique associated with the storage device on which they are stored. This will increase the likelihood of a useful pre-read and reduce the likelihood of an actual read not being satisfied from a pre-read.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

FIG. 1 illustrates a conventional file system block allocator 100. The allocator 100 is responsible for allocating blocks of storage from an entire pool 110 of storage. The blocks b10 through b99 are illustrated as an addressable array of blocks. One skilled in the art will appreciate that different storage devices can have different arrangements of blocks. Allocator 100 receives a block request 130. Conventionally, block request 130 includes a size and a location. Based on the size requested, the allocator 110 picks a block or blocks from the entire pool 110 and allocates them in response to the block request 130.

Figure 2:
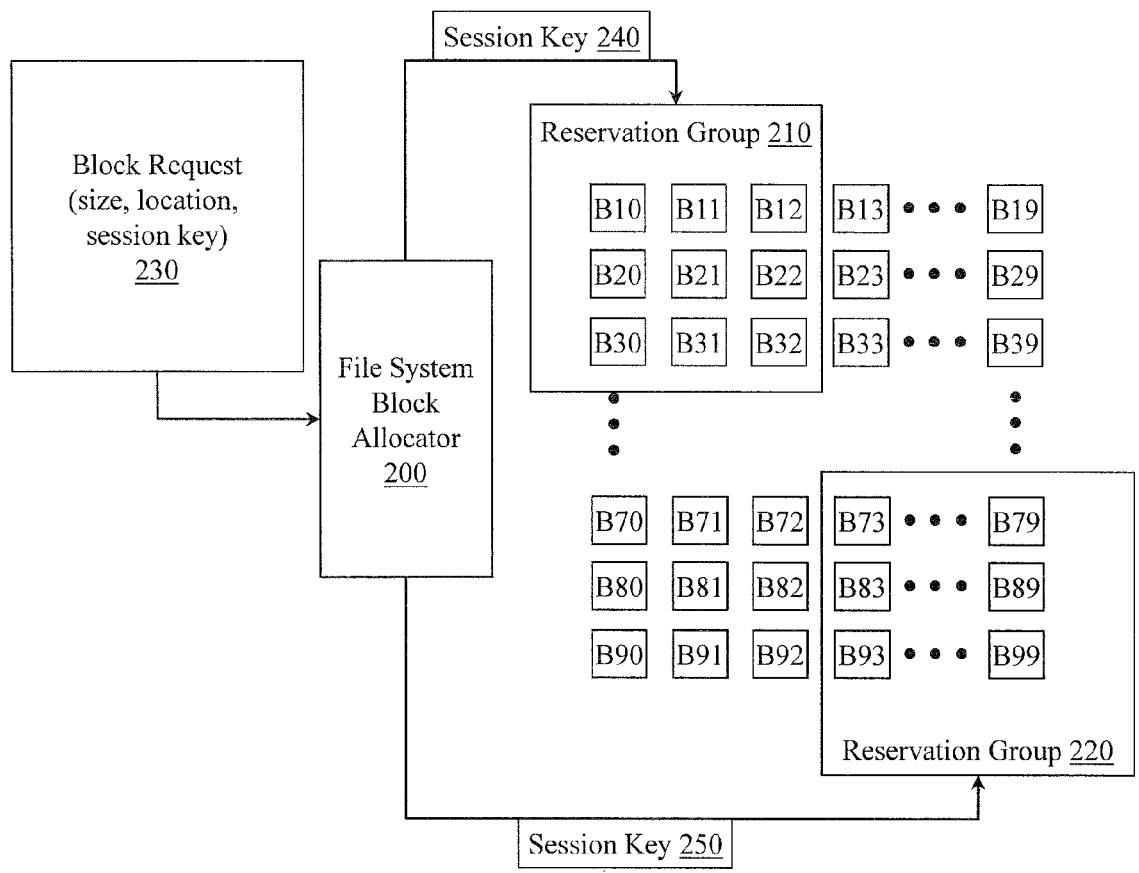
FIG. 2 illustrates an embodiment of a block allocator configured to improve spatial locality of block allocations for related items.

FIG. 2 illustrates an embodiment of a block allocator 200 that is configured to improve spatial locality of block allocations for related items. Block allocator 200 has access to a group of blocks (e.g., blocks b10 through b99). However, instead of the group of blocks being just one big set of blocks, additional organization has been imposed on the group of blocks. A reservation group 210 has been created and associated with a session key 240. Similarly, a reservation group 220 has been created and associated with a session key 250. When the allocator 200 receives a block request 230, it will determine whether the request 230 includes a session key in addition to the conventional size and location information. If a session key is present in request 230, then allocator 200 can allocate a block or blocks from a reservation group associated with the session key. For example, if the request 230 included a session key 240, then a block would be allocated from reservation group 210.

If the request includes a session key for which no reservation group has yet been created, then the block allocator 200 may create a new reservation group and then satisfy the request from that reservation group. In different embodiments, reservation groups can be volatile or persistent. In an embodiment where a reservation group is volatile, reservation groups may need to be re-established upon the occurrence of certain conditions (e.g., server process is restarted). In an embodiment where a reservation group is persistent, an on-disk structure stores information that allows a session to persist across instances of a server process.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
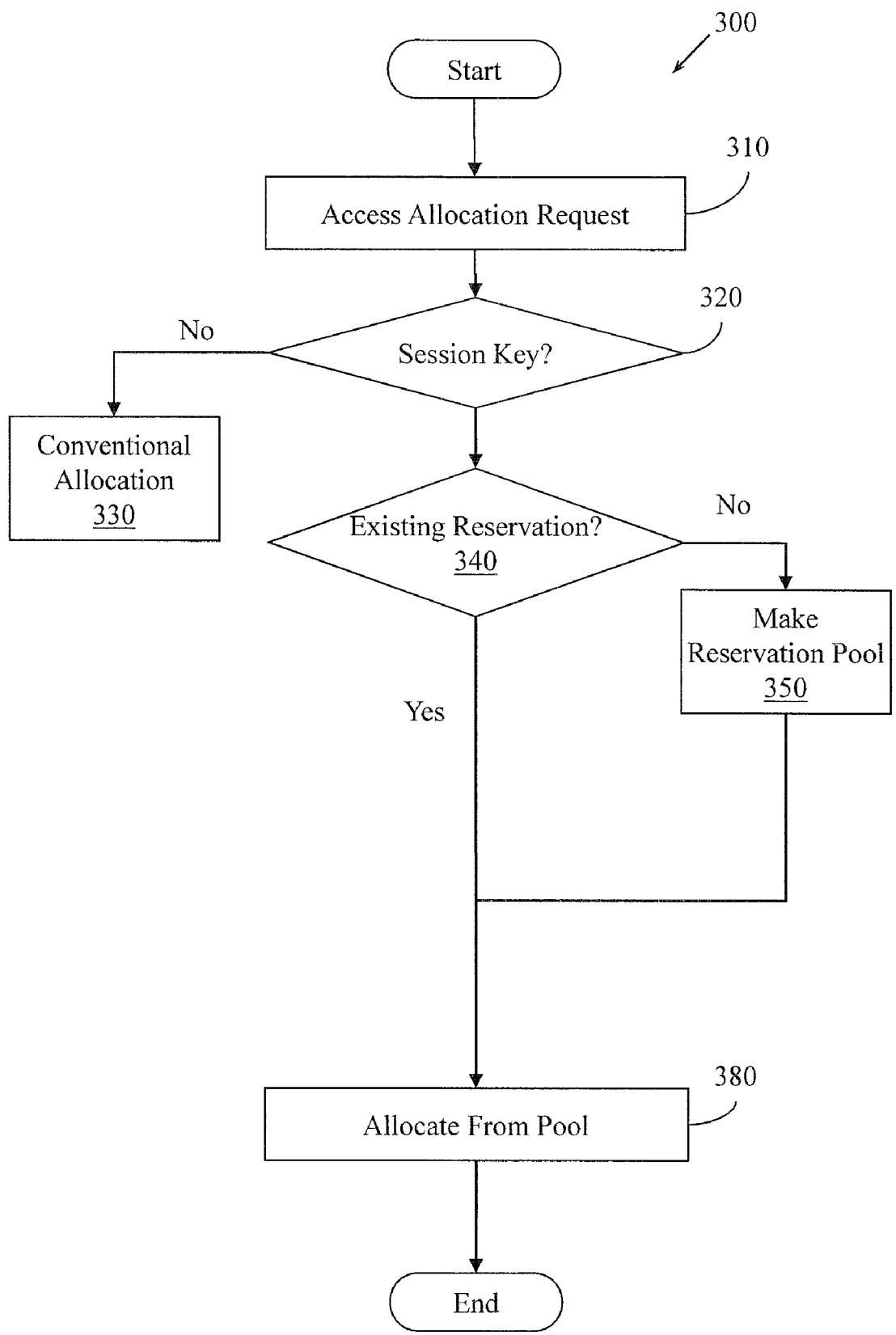
FIG. 3 illustrates an embodiment of a method for improving spatial locality of block allocations for related items.

FIG. 3 illustrates an embodiment of a method 300 for improving spatial locality of block allocations for related items. Method 300 includes, at 310, accessing a block allocation request. Recall that a block allocation request is configured to control a computer to allocate a block of storage available on a storage device in response to the block allocation request.

At 320, method 300 determines whether a session key is present in the block allocation request. If the determination at 320 is No, then conventional allocation occurs at 330. But if the determination at 320 is Yes, then processing continues at 340.

At 340, method 300 determines whether the session key is associated with an existing reservation. If the determination is No, then a block reservation pool is created at 350. As part of creating the block reservation pool, the method can include associating the session key to the new block reservation pool. But if the determination is Yes, then method 300 proceeds to 380. At 380, upon determining that the block allocation request includes a session key that identifies a session associated with a block reservation pool, method 300 includes controlling the computer to allocate a block of storage from the block reservation pool to satisfy the block allocation request. Recall that a block reservation pool is blocks of storage on the storage device that satisfy a spatial locality relationship determined by a pre-read technique associated with the storage device. While creating the reservation pool in response to receiving an allocation request is illustrated, in a different embodiment, a reserved block could be pre-reserved and pre-associated with a session key.

The storage device can take different fauns including, but not limited to, a disk drive, a tape drive, and a redundant array of independent disks. Therefore, in one example, controlling the computer to allocate a block of storage at 380 includes controlling the computer to allocate the block of storage according to a pattern related to the pre-read technique. Different storage devices may have different pre-read techniques. For example, a disk may pre-read blocks from logically adjacent but physically separate sectors while a tape drive may pre-read blocks from physically adjacent locations.

The block allocation request can originate in different places. In one example, the block allocation request is associated with a file and is provided by a file system block allocator. When the block allocation request is associated with a file, the block allocation request may also be associated with a directory in which the file is stored, an application that created the file, an application processing the file, or other entity.

In one example, a method may be implemented as computer executable instructions. Thus, in one example, a computer readable medium may store computer executable instructions that if executed by a computer cause the computer to perform method 300. While executable instructions associated with method 300 are described as being stored on a computer readable medium, it is to be appreciated that executable instructions associated with other example methods described herein may also be stored on a computer readable medium.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

Figure 4:
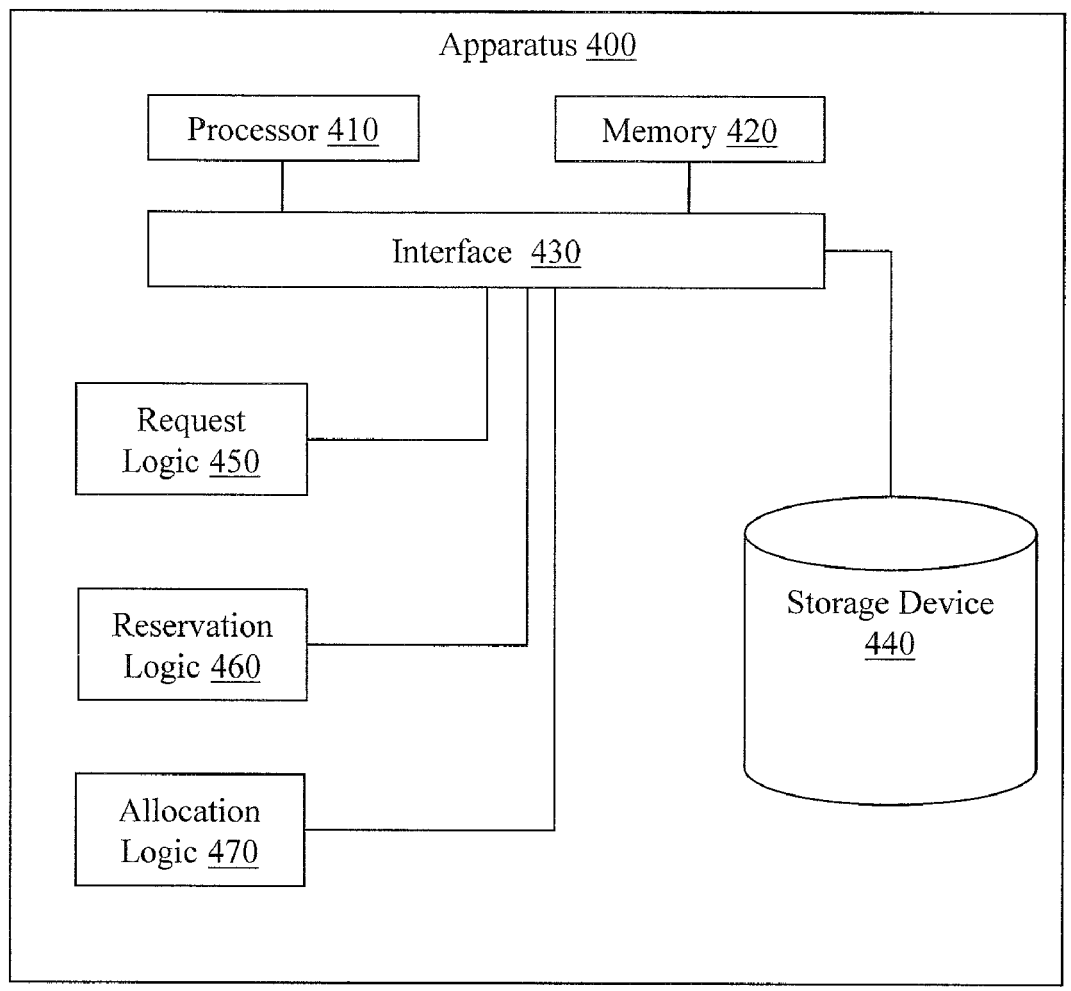
FIG. 4 illustrates an embodiment of an apparatus for improving spatial locality of block allocations for related items.

FIG. 4 illustrates an apparatus 400. Apparatus 400 includes a storage device 440. Storage device 440 may have blocks of storage available to allocate. Apparatus 400 is configured to logically and/or physically group blocks on storage device 440 in a manner that improves spatial locality between related items, which in turn facilitates increasing pre-read accuracy. Apparatus 400 also includes a processor 410, a memory 420, and an interface 430. The interface 430 connects the processor 410, the memory 420, the data store 440, and a set of logics. The storage device 440 may be, for example, a disk drive, a tape drive, and a redundant array of independent disks.

The set of logics may include a request logic 450, a reservation logic 460, and an allocation logic 470. In one embodiment, the request logic 450 is configured to selectively provide a block allocation request to the reservation logic 460 when the request logic 450 determines that the block allocation request includes a spatial locality identifier for which no reserved set of blocks exists. Thus, the request logic 450 first determines whether an incoming block allocation request includes a field indicating that the allocation is to be satisfied from a special pool of blocks that are arranged to improve spatial locality and thus to improve the benefits of pre-reading blocks.

The request logic 450 is also configured to selectively provide the block allocation request to the allocation logic 470. The request logic 450 provides the block allocation request to the allocation logic 470 upon determining that the block allocation request includes a spatial locality identifier for which a reserved set of blocks exists.

The request logic 450 can also be configured to control the allocation logic 470 to satisfy the block allocation from blocks not in a reserved set of blocks. The request logic 450 will control the allocation logic 470 to satisfy the block allocation request from generally available blocks (e.g., blocks not in a reserved set of blocks) upon determining that the block allocation request does not include a spatial locality identifier.

The reservation logic 460 produces a reserved set of blocks on the storage device 440. The reservation logic 460 also associates the spatial locality identifier to the reserved set of blocks. Thus, when subsequent block allocation requests that include the spatial locality identifier are received, those requests can be satisfied from the reserved set of blocks associated with that spatial locality identifier. In one embodiment, the reservation logic 460 produces a reserved set of blocks in response to the request logic 450 receiving an allocation request. In another embodiment, the reservation logic 460 may pre-reserve a reserved set of blocks before an allocation request is received.

The reservation logic 460 selects blocks for the reserved set of blocks upon determining that the blocks are related by a desired spatial locality relationship between the blocks. In one example, the reservation logic 460 is configured to produce the reserved set of blocks on the storage device 440 by identifying a set of blocks that are available on the storage device 440 and then forming the reserved set of blocks from blocks in the set of blocks. The blocks selected for the reserved set will be blocks for which the likelihood that the blocks will be read in order by a pre-read technique of the storage device exceeds a threshold.

In one example, the spatial locality identifier identifies a directory in which a related set of files are stored. In this example, the request logic 450 is configured to receive the block allocation request from a file system block allocator. When the reservation logic 460 is producing a reserved set of blocks that are associated with files located in a directory, the reservation logic 460 produces the reserved set of blocks on the storage device 440 as controlled by a property of the directory identified by the session identifier. The property can be, for example, the number of files in the directory, the size of individual files in the directory, the collective size of the files in the directory, and an application associated with one or more files in the directory.

The allocation logic 470 is configured to satisfy block allocation requests from reserved sets of blocks. The particular reserved set of blocks is determined by the spatial locality identifier found in a block allocation request. The allocation logic 470 can allocate blocks in different ways depending, for example, on the type of storage device 440, on a pre-read technique employed by the storage device 440, and other factors. Thus, in one embodiment, the allocation logic 470 may be configured to satisfy the block allocation from the reserved set of blocks associated with the spatial locality identifier according to an allocation plan tuned to a pre-read approach associated with the storage device. In one embodiment, the pre-read approach may include providing consecutive blocks from the reserved set of blocks.

A reserved set of blocks may provide superior results when it is tuned from periodic and/or threshold based maintenance. Thus, in one embodiment, the reservation logic 460 may be configured to close a reserved set of blocks upon determining that an allocation threshold has not been met. Closing the reserved set comprises removing unallocated blocks from the reserved set. The allocation threshold may not be met when, for example, a ratio of allocated blocks to unallocated blocks has not reached a desired ratio. The periodic and/or threshold based maintenance may also include defragmentation. Therefore, in one embodiment the reservation logic 460 may be configured to defragment a reserved set of blocks upon determining that a fragmentation threshold has been exceeded. The fragmentation threshold may be met when, for example, the average length of contiguously allocated blocks compared to the number of allocated blocks falls below a desired ratio.

Figure 5:
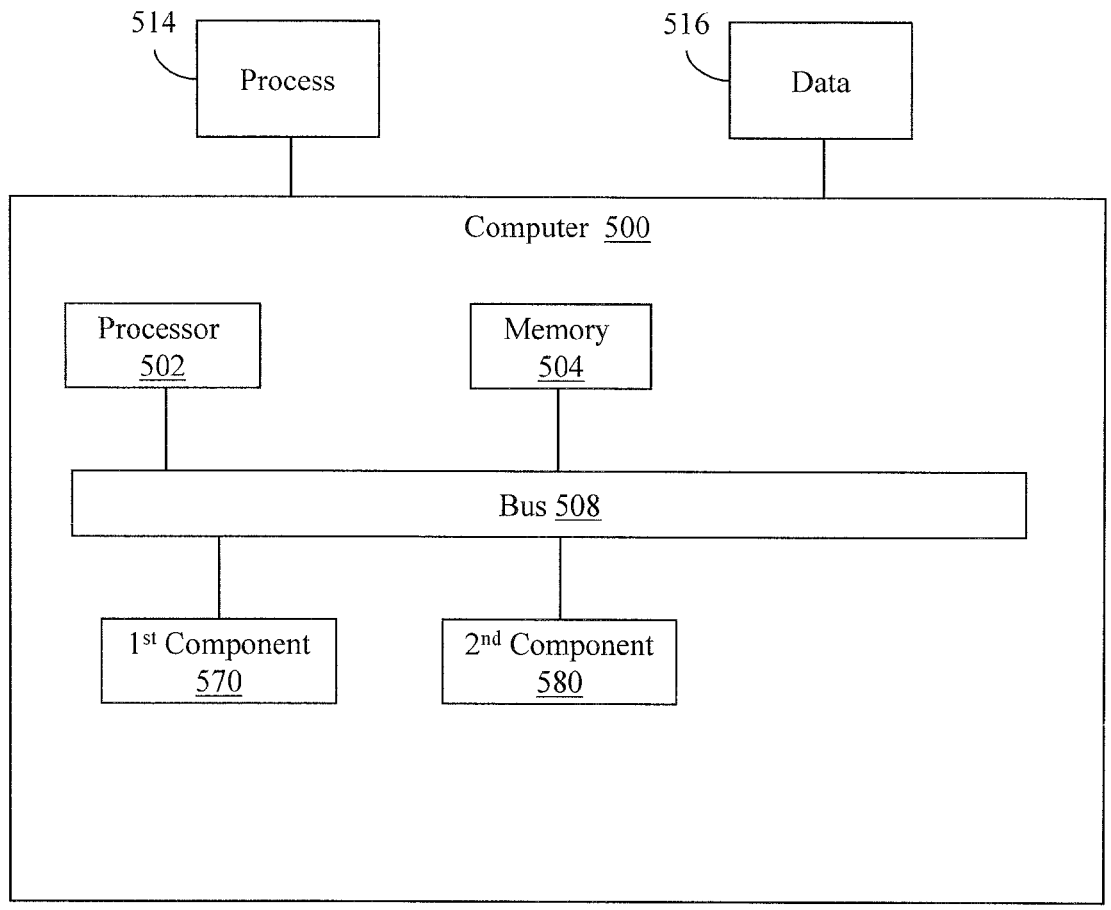
FIG. 5 illustrates a computer configured to improve spatial locality of block allocations for related items.

FIG. 5 illustrates a computer 500. Computer 500 includes a processor 502 and a memory 504 that are operably connected by a bus 508. In one example, the computer 500 may include a first component 570 configured to process allocation requests that include a spatial locality parameter. The first component 570 may process these allocation requests by allocating blocks of storage from a set of blocks held for use for requesters identified with the spatial locality parameter. The set of blocks are located on a storage device. In one embodiment, the storage device may be a portion of computer 500 while in another embodiment the storage device may be a device controlled by and separate from computer 500. The first component 570 can therefore implement some and/or all of method 300.

Computer 500 can also include a second component 580 that is configured to process block allocation requests that do not include a spatial locality parameter. The second component 580 processes these requests by allocating blocks of storage from a generally available set of blocks on the storage device and not from blocks reserved for use by an entity associated with a session that provides a spatial locality identifier.

The first component 570 and the second component 580 may be, for example, ASICs inserted into computer 500. While two separate components are illustrated, one skilled in the art will appreciate that a greater and/or lesser number of components could be present in computer 500 and tasked with performing method 300.

Generally describing an example configuration of the computer 500, the processor 502 may be a variety of various processors including dual microprocessor and other multi-processor architectures. A memory 504 may include volatile memory (e.g., RAM (random access memory)) and/or non-volatile memory (e.g., ROM (read only memory)). The memory 504 can store a process 514 and/or a data 516, for example. The process 514 may be a data de-duplication process and the data 516 may be an object to be de-duplicated.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE (peripheral component interconnect express), 1394, USB (universal serial bus), Ethernet). The bus 508 can be types including, for example, a memory bus, a memory controller, a peripheral bus, an external bus, a crossbar switch, and/or a local bus.

Figure 6:
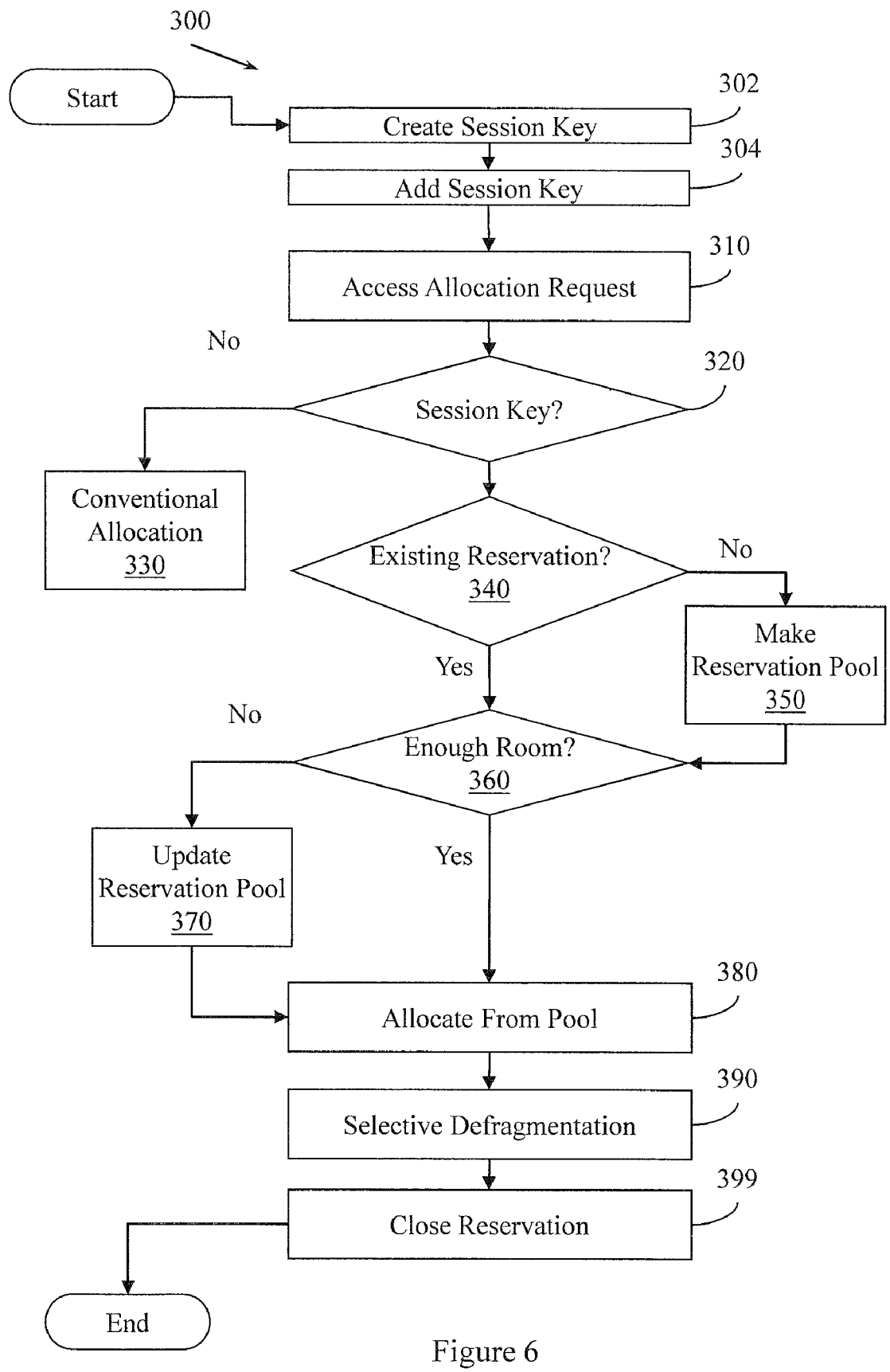
FIG. 6 illustrates another embodiment of the method for improving spatial locality of block allocations for related items.

FIG. 6 illustrates another embodiment of method 300. This embodiment includes additional actions when compared to the embodiment illustrated in FIG. 3. For example, this embodiment of method 300 includes, at 302, creating a session key. In different embodiments, the method 300 may control an operating system, a file system, an application, or other process to create the session key. The session key will be associated with a session that will process related items. The session may be defined, for example, by a user controlled data entry, file membership in a directory, an application, a process, and other defining entities. Once the session key is available and the session has been defined, then creating the session key at 302 can be completed by establishing a relation between the session key and the session. While the term "session" is employed, one skilled in the art will appreciate that more generally the "session key" is an identifier of a process, file, directory, application, or other entity for which improved spatial locality of blocks is desired.

At 304, when an entity associated with the session makes a block request, the session key can be added to the block request to control the block allocator to allocate a block from a reservation pool with improved spatial locality.

At 360, a determination is made concerning whether an existing reservation pool has enough room left over to satisfy a block allocation request. If the determination at 360 is No, then method 300 may include, at 370, updating the reservation pool with additional blocks for which a desired spatial locality relationship can be maintained.

Over time, a data storage device can become fragmented. Thus, operating systems and file systems frequently include utilities to selectively defragment the storage device in response to determining that a fragmentation threshold has been exceeded. While defragmentation at the device level has value, example systems and methods may produce a situation where defragmenting at a reservation pool level has value. Therefore, method 300 may include, at 390, selectively defragmenting a block reservation pool in response to determining that a block reservation pool fragmentation threshold has been exceeded. Fragmentation may occur as blocks are allocated and de-allocated. When a contiguous pre-read approach is employed to pre-read blocks from a storage device, defragmenting a pool may yield improved pre-read hit accuracy.

Sometimes block reservation pools may be created and then either not used or under-utilized. Rather than suffer with this inefficiency, method 300 may also include, at 399, selectively abandoning a block reservation pool in response to determining that a response pool usage threshold has not been met. For example, if one thousand blocks were allocated and only fifteen blocks were ever used, then the reservation pool may be abandoned and/or have its size reduced.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:
    accessing a block allocation request that is configured to control a computer to allocate a block of storage available on a storage device; and
    upon determining that the block allocation request includes a session key that identifies a session associated with a block reservation pool, controlling the computer to allocate a block of storage from the block reservation pool to satisfy the block allocation request, the block reservation pool comprising blocks of storage on the storage device that satisfy a spatial locality relationship determined by a pre-read technique associated with the storage device.

2. The method of claim 1, the storage device being one of, a disk drive, a tape drive, and a redundant array of independent disks.

3. The method of claim 2, comprising:
    upon determining that the block allocation request includes a session key that identifies a session that is not yet associated with a block reservation pool,
    controlling the computer to create a new block reservation pool and to associate the session to the new block reservation pool using the session key.

4. The method of claim 3, where controlling the computer to create a new block reservation pool comprises:
    identifying a set of blocks that are available on the storage device; and
    forming the block reservation pool from blocks for which the likelihood that the blocks will be read in order by a pre-read technique of the storage device exceeds a threshold.

5. The method of claim 2, comprising:
    establishing a relation between a session key and a session, where the session is defined by one of, a user controlled data entry, file membership in a directory, an application, and a process.

6. The method of claim 1, where the block allocation request is associated with a file and is provided by a file system block allocator.

7. The method of claim 1, where controlling the computer to allocate a block of storage from the block reservation pool comprises controlling the computer to allocate the block of storage according to a pattern related to the pre-read technique.

8. The method of claim 1, comprising:
    selectively defragmenting the storage device in response to determining that a fragmentation threshold has been exceeded;
    selectively defragmenting a block reservation pool in response to determining that a block reservation pool fragmentation threshold has been exceeded; and
    selectively abandoning the block reservation pool in response to determining that a response pool usage threshold has not been met.

9. The method of claim 1, comprising:
    controlling the computer to create a new block reservation pool independent of receiving a block allocation request;
    controlling the computer to create a new session key independent of receiving a block allocation request; and
    controlling the computer to associate the session key to the new block reservation pool.

10. An apparatus, comprising:
    a storage device configured with blocks of storage available to be allocated:
    a processor;
    a memory; and
    an interface to connect the processor, the memory, the storage device, and a set of logics, the set of logics comprising:
        a request logic;
        a reservation logic; and
        an allocation logic,
        the request logic being configured to selectively provide a block allocation request to the reservation logic upon determining that the block allocation request includes a spatial locality identifier for which no reserved set of blocks exists,
        the request logic being configured to selectively provide the block allocation request to the allocation logic upon determining that the block allocation request includes a spatial locality identifier for which a reserved set of blocks exists,
        the reservation logic being configured to produce a reserved set of blocks on the storage device and to associate the spatial locality identifier to the reserved set of blocks, the reserved set of blocks being related by a desired spatial locality relationship between the blocks, and the allocation logic being configured to satisfy the block allocation request from a reserved set of blocks associated with the spatial locality identifier.

11. The apparatus of claim 10, the storage device being one of, a disk drive, a tape drive, and a redundant array of independent disks.

12. The apparatus of claim 11, the request logic being configured to control the allocation logic to satisfy the block allocation from blocks not in a reserved set of blocks upon determining that the block allocation request does not include a spatial locality identifier.

13. The apparatus of claim 11, the allocation logic being configured to satisfy the block allocation from the reserved set of blocks associated with the spatial locality identifier according to an allocation plan tuned to a pre-read approach associated with the storage device.

14. The apparatus of claim 13, the pre-read approach comprising providing consecutive blocks from the reserved set of blocks.

15. The apparatus of claim 11, the reservation logic being configured to close a reserved set of blocks upon determining that an allocation threshold has not been met, where closing the reserved set comprises removing unallocated blocks from the reserved set.

16. The apparatus of claim 11, the reservation logic being configured to defragment a reserved set of blocks upon determining that a fragmentation threshold has been exceeded.

17. The apparatus of claim 11, where the session identifier identifies a directory in which a related set of files are stored and where the request logic is configured to receive the block allocation request from a file system block allocator.

18. The apparatus of claim 17, the reservation logic being configured to produce the reserved set of blocks on the storage device as controlled by a property of the directory identified by the session identifier, the property being one or more of, the number of files in the directory, the size of individual files in the directory, the collective size of the files in the directory, and an application associated with one or more files in the directory.

19. The apparatus of claim 11, the reservation logic being configured to produce the reserved set of blocks on the storage device by:

identifying a set of blocks that are available on the storage device; and forming the reserved set of blocks from blocks in the set of blocks for which the likelihood that the blocks will be read in order by a pre-read technique of the storage device exceeds a threshold.

20. A computer, comprising:

a processor;

a memory;

a first component;

a second component; and a bus connecting the processor, the memory, the first component, and the second component, the first component being configured to process allocation requests that include a spatial locality parameter by allocating blocks of storage from a set of blocks held for use for requesters identified with the spatial locality parameter, the set of blocks being located on a storage device, the set of blocks being arranged in a manner that increases the likelihood that related blocks will be read together by a device pre-read process, and the second component being configured to process block allocation requests that do not include a spatial locality parameter by allocating blocks of storage from a generally available set of blocks on the storage device.

* * * * *